United States Patent Office.

ALBERT DOMEIER AND OTTO CHRISTIAN HAGEMANN, OF LONDON, ENGLAND, ASSIGNORS TO SAID DOMEIER, AND JOSEPH GLATZ, OF BROOKLYN, NEW YORK.

PROCESS OF MAKING RESIN-SOAP AND GLYCERINE.

SPECIFICATION forming part of Letters Patent No. 385,105, dated June 26, 1888.

Application filed September 14, 1887. Serial No. 249,694. (No specimens.)

*To all whom it may concern:*

Be it known that we, ALBERT DOMEIER and OTTO CHRISTIAN HAGEMANN, residents of London, England, have invented an Improved Process of Treating Soap-Lyes Containing Alkali for the Purpose of Obtaining Resin-Soap, Glycerine, and other Products Therefrom, of which the following is a specification.

The object of our invention is to recover waste alkali from spent soap-lyes, and to manufacture resin-soap from the same, and also to obtain glycerine from said lye.

In many cases the lye which escapes from the soap-factory contains some free alkali, which will exist as carbonate or as a mixture of caustic and carbonate. We eliminate such alkali as follows: The spent lyes are preferably collected in a suitable tank, and are treated with sufficient lime to convert all the carbonated alkali present into caustic alkali. The lime is then allowed to settle, leaving the lye clear. This lye is then drawn off and concentrated by boiling to a salting-point. This concentrated lye, in which all the alkali present is now caustic, is then conveyed to a soap-copper and sufficient resin added as will take up the whole of the caustic alkali and form resin-soap, the lye being allowed to settle therein, the resin-soap being deposited in the copper. We now draw off the lye so separated from the resin-soap into another tank and mix with it an insoluble silicate—such as silicate of alumina (kaolin) or silicate of magnesia, glass flour, or finely-divided silica—the mixing being by preference effected while blowing air through the lye for the purpose of agitation and intimate mixture. A good proportion is the addition of about one and a half pound of kaolin to sixty gallons of lye. We now add an excess of hydrochloric or other acid and continue the blowing of air for some time after the acid has been added, allowing the resultant precipitate to settle, whereupon we draw off the clear lye. By an excess of hydrochloric acid we mean such a quantity of acid as will show from one to one and a half per cent. of free acid to the original bulk of the lye. The exact quantity to be added depends necessarily upon the fatty and resinous matter contained in the lye. By the addition of the acid the fatty and resinous constituents of the lye are rendered insoluble, and, being liberated from the solution in the presence of the finely-divided kaolin, combine mechanically with the same, forming a heavy precipitate, which quickly subsides, leaving the lye clear and bright. We now add to the lye soda, either caustic or carbonate of soda, the same being added in such proportions as to render the liquor faintly alkaline, and we heat the lye to about eighty degrees centigrade, and allow the resulting precipitate to settle, drawing off the clear lye. The object of adding the soda is to purify the lye from albuminous matters, which coagulate and fall to the bottom. Instead of soda any other suitable alkali may be added to the lye. Finally, we boil the lye for the purpose of evaporating more water, and thereby causing the salt which is carried in the lye to crystallize. This salt may be washed and used over again in the manufacture of soap. The lye is by the final evaporating process concentrated, so as to eliminate the remainder of the water and most of the salt, giving as a final product crude glycerine, which is fit for distillation without any other treatment.

The resin-soap, produced as before described, may be added in proper proportions to tallow-soap in the ordinary course of manufacturing soaps. Thus the soap-maker recovers all the alkali which would otherwise be wasted.

We will here recapitulate in brief our process for recovering waste alkali and forming resin-soap from spent soap-lye containing alkali, and of recovering glycerine from the lye so freed from the alkali. The lye containing alkali is treated, first, by adding lime; secondly, by adding resin and settling the lye to make and separate resin-soap; thirdly, the lye is treated by adding the hydrochloric acid and the kaolin; fourthly, by adding soda, and, fifthly, concentrating it until the salt is crystallized and the glycerine formed.

We do not here claim anything described in our application for patent for treating soap-lyes filed March 18, 1887, and serially numbered 231,357.

Having now described our invention, what we claim is—

1. The process of preparing resin-soap from spent lye containing carbonated alkali, which consists in first adding lime to said lye and converting the carbonated alkali it contained into caustic alkali, in then allowing the lime to settle, drawing off the lye and concentrating it, and then adding resin sufficient to combine with said caustic alkali, as set forth.

2. The process herein described of converting lye containing alkali into resin-soap and glycerine, which consists in adding to the lye lime, then resin, then settling the lye to separate the resin-soap, then adding acid in the presence of a mechanical carrier of the resulting precipitate, (of the nature of an insoluble powder,) then soda, then finally boiling down the lye until the salt it contains crystallizes and glycerine is formed, as set forth.

ALBERT DOMEIER.
OTTO CHRISTIAN HAGEMANN.

Witnesses:
S. CRANSA,
C. DODGE,
*Both of 9 Birchin Lane, E. C.*